United States Patent [19]

Yu et al.

[11] Patent Number: 5,694,504
[45] Date of Patent: Dec. 2, 1997

[54] SEMICONDUCTOR MODULATOR WITH A π SHIFT

[75] Inventors: Jun Yu, Stittsville, Canada; George Horace Brook Thompson, Shawbridgeworth; Mark Acton Gibbon, Bishops Stortford, both of England; David Owen Yevick, Nepean; Claude Rolland, Ottawa, both of Canada

[73] Assignee: Northern Telecom Limited, Montreal, Canada

[21] Appl. No.: 612,555

[22] Filed: Mar. 8, 1996

[30] Foreign Application Priority Data

Jun. 28, 1995 [GB] United Kingdom ............... 9513146

[51] Int. Cl.⁶ .................................................. G02B 6/26
[52] U.S. Cl. ......................... 385/45; 385/3; 385/4; 359/248
[58] Field of Search ........................ 385/45, 8, 2, 14, 385/16, 39–44, 1, 3, 4, 5; 359/248, 245

[56] References Cited

U.S. PATENT DOCUMENTS

| 5,347,601 | 9/1994 | Ade et al. ............... 385/3 |
| 5,524,076 | 6/1996 | Rolland et al. ............. 385/45 X |
| 5,535,045 | 7/1996 | Dutta et al. ............. 359/248 |

OTHER PUBLICATIONS

C. Rolland et al., "10 Gb/s, 120 km Normal Fiber Transmission experiment using a 1.56 μm Multiple Quantum Well InP/InGaAsP Mach–Zhnder Modulator", Conf. Optical Fiber Communication, San Jose, CA 1993, pp. 111–114 No Month.

T. Okiyama et al., "10 Gb/s Transmission in Large–Dispersion Feber Using a Ti:LiNbO₃ Mach–Zehnder Modulator" Conf. Integrated Optics and Optical Fiber Communication, Kobe, Japan 1989, pp. 208–209 No Month.

A. H. Gnauck et al., "Dispersion Penalty Reduction Using an Optical Modulator with Adjustable Chirp", IEEE Photonics Technology Letters, vol. 3, No. 10, Oct. 1991, pp. 916–918.

S.K. Korotky et al., "High–Speed, Low Power Optical Modulator with Adjustable Chirp Parameter", Integrated Photonics Research 1991, pp. 53–54 No Month.

*Primary Examiner*—Phan T. H. Palmer
*Attorney, Agent, or Firm*—Foley & Lardner

[57] ABSTRACT

A MQW semiconductor Mach Zehnder phase modulator is formed by two Y-junctions (12, 32), each having a single waveguide (14) optically coupled with two branch waveguides (18, 20). The branch waveguides of the two Y-juntions are optically coupled in Mach-Zehnder configuration that, under zero bias conditions, has one interferometric arm longer than the other to provide a π phase shift. The additional length is preferably accommodated in the branches of the Y-junctions. The phase shift, in combination with voltage dependent absorption properties and non-linear phase variations of the MQW guided regions in the Mach-Zehnder modulator results in a negative chirp and high extinction ratio for an equal, push-pull device configuration.

12 Claims, 5 Drawing Sheets

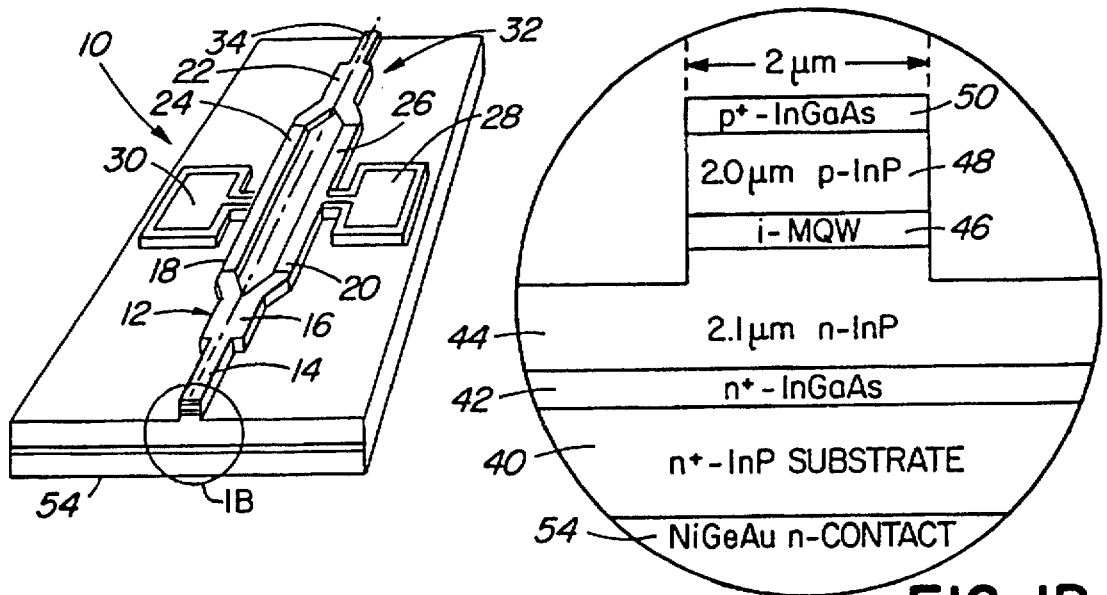
FIG. 1A  FIG. 1B
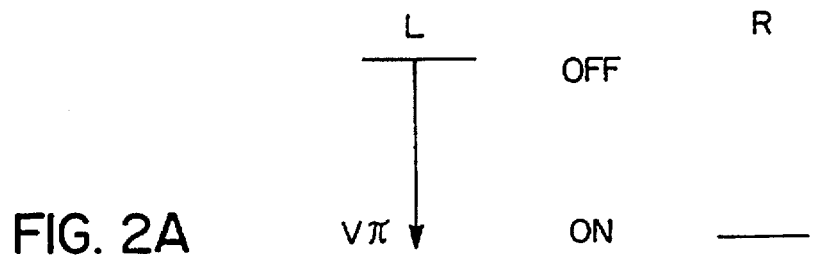
FIG. 2A
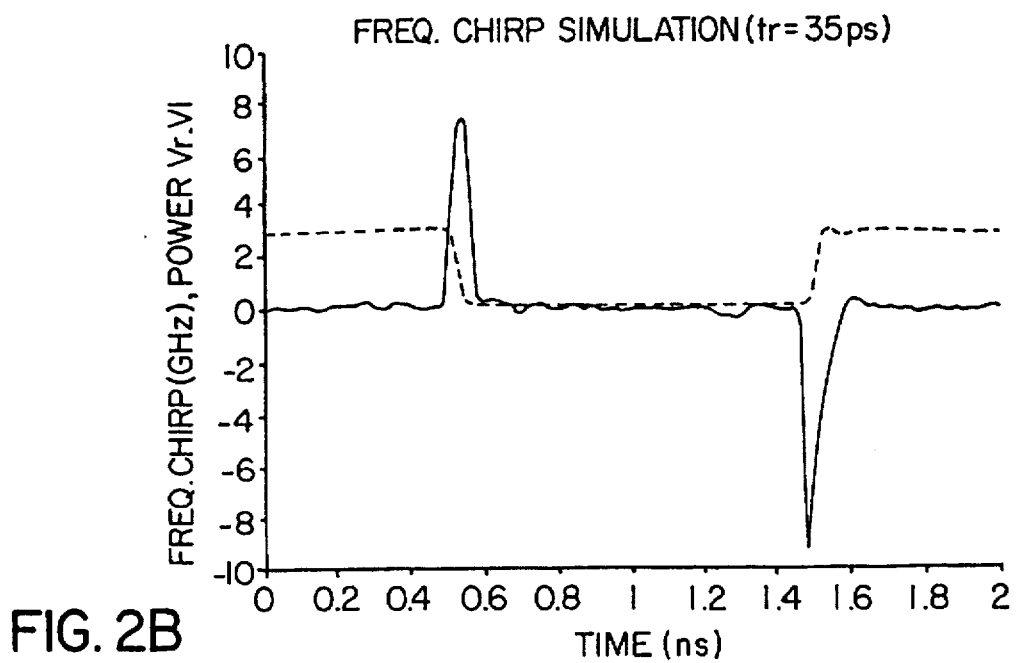
FIG. 2B

SEMICONDUCTOR MODULATOR WITH A π SHIFT

FIELD OF THE INVENTION

This invention relates to semiconductor phase modulators and more particularly to Mach-Zehnder semiconductor modulators with a π shift (or odd multiples thereof) for generating a modulated optical signal having negative frequency chirp with a high extinction ratio.

BACKGROUND OF THE INVENTION

The ever increasing demand for higher data rate transfer in communication networks at competitive costs requires optimum utilization of optical fiber transmission links. One consequence has been the adoption of an operating wavelength of 1.55 μm in order to take advantage of a lower fiber loss. Unfortunately, chromatic dispersion of conventional single mode fibers is higher at 1.55 μm than at the previously used wavelength of 1.31 μm. This dispersion originates from a frequency dependent group velocity and is typically 17 ps/nm·km for single mode fiber at a wavelength of 1.55 μm.

Semiconductor lasers and particularly lasers fabricated from selected III–V compounds such as inGaAsP/InP can be tailored to generate an optical signal at the appropriate wavelength. Modulated lasers, however, have spectral broadening due in part to a wavelength shift or chirp brought about by the modulation. The pulse broadening is a result of a wavelength shift to shorter wavelengths (blue shift) at the rising edge of a modulating pulse and a wavelength shift to longer wavelengths (red shift) at the falling edge of the pulse. This is known as positive frequency chirp. Propagating through a fiber, a pulse with positive frequency chirp is broadened because the rising edge moves faster and the falling edge moves slower. This frequency chirp can be quite large for directly modulated lasers and, as a result, the span between repeaters in an falling edge of the pulse. This is known as positive frequency chirp. Propagating through a fiber, a pulse with positive frequency chirp is broadened because the rising edge moves faster and the falling edge moves slower. This frequency chirp can be quite large for directly modulated lasers and, as a result, the span between repeaters in an optical fiber network operating at high speed and utilizing such devices as transmitters is necessarily low.

Using current technology, directly modulated 1.55 μm lasers having multi-quantum-wells are capable of transmitting data rates of 2.5 Gb/s with a repeater span of 80 km. The dispersion penalty at this wavelength, however, is too large for practical long haul transmission via non-dispersion shifted fiber at 10 Gb/s.

An alternative to directly modulated lasers is an electro-optical modulator which, in conjunction with a C.W. operated laser, offers the promise of a modulated signal with controllable chirp.

An electro-optical modulator of particular interest is the Mach-Zehnder phase modulator operating as an interferometer. Prior art Mach-Zehnder modulators are commonly fabricated in lithium niobate (LiNbO₃) with titanium (Ti) diffused waveguides. The frequency chirp characteristics of such devices have been studied and reported in the literature. Okiyama et al ("10 Gb/s Transmission in Large Dispersion Fiber Using Ti:LiNbO₃ Mach-Zehnder Modulator", Conf. Integrated Optics and Optical Fiber Communication, Kobe, Japan, 1989), reported that Mach-Zehnder modulators could modulate a CW laser at bit rates up to 10 Gb/s although frequency chirp was noted.

Korotky et al ("High Speed Low Power Optical Modulator with Adjustable Chirp Parameters", Topical Meeting of Integrated Photonics Research, Monterey, Calif., 1991) reported that the chirp of a LiNbO₃ modulator could be controlled by tailoring the modulation voltage supplied to the electrodes. Korotky et al found that the modulator could be rendered essentially "chirpless" although such a condition was not necessarily ideal and that some negative chirp might be advantageous.

Gnauck et al ("Dispersion Penalty Reduction Using an Optical Modulator with Adjustable Chirp", Photonics Tech. Lett., Vol.3, pp. 916–918, 1991) describe a Ti:LiNbO₃ Mach-Zehnder modulator which can be operated "chirpless" or with negative chirp. It is reported that slightly negative values of frequency chirp could be used to reduce pulse broadening and hence lower the dispersion penalty.

More recently Mach-Zehnder modulators have been fabricated in III–V material such as InP with multi-quantum wells of InP/InGaAsP in the guided regions. Such a device is described by Rolland et al ("10 Gb/s 120 km Normal Fiber Transmission Experiment Using a 1.56 μm Multi-Quantum-Well InP/InGaAsP Mach-Zehnder Modulator", Conf. Optical Fiber Communication, San Jose, Calif. 1993) in which some frequency chirp regulation is possible.

A Mach-Zehnder phase modulator is based on an interferometric configuration which converts phase modulation into intensity modulation. When the differential phase shift between the two arms of the modulator equals ±π, the antisymmetric mode is excited near the output and is subsequently diffracted out of the single mode waveguide. This is the 'off' or logic '0' state. With no differential phase shift, the fundamental mode is excited and propagates with little loss to the output. This is the 'on' or logic '1' state. The ability to control the frequency chirp of Mach-Zehnder modulators by varying the drive voltage to the arms or by a power splitting ratio has made them well suited for multi-gigabit long distance optical fiber transmission.

The drive voltage which controls the differential phase shift is conventionally supplied to one arm (single arm drive) or to both arms (dual arm drive). This relationship will be discussed in greater detail later. In any event single arm drive conditions require a larger operating voltage than dual arm drive, while the dual arm drive with equal push-pull voltage for a LiNbO₃ modulator gives substantially zero chirp.

One significant difference between a III–V Mach-Zehnder modulator and a LiNbO₃ Mach-Zehnder is that in the former, absorption increases with voltage applied to the arms while absorption is not present in the latter. The amount of absorption in the III–V device depends on how close the operating wavelength is to the exciton peak of the multi-quantum-well material. Another difference between a LiNbO₃ Mach-Zehnder and a III–V device having a MQW is that the latter shows a non-linear phase change as a function of bias voltage. Both of these characteristics, i.e., voltage dependent absorption and non-linear phase change are used to advantage in the present invention.

Because the Mach-zehnder modulator converts phase modulation into intensity modulation it is important that the ratio between the 'on' state and 'off' state is relatively high. This ratio, also known as the extinction ratio, is a measure of the signal intensity against background noise. Consequently, a high extinction ratio also permits a greater span between repeaters in a transmission network. It is known that III–V modulators are capable of achieving negative chirp but at the expense of a reduced extinction ratio.

SUMMARY OF THE INVENTION

It is an object of the present invention to provide a Mach-Zehnder phase modulator that can be driven in a manner providing negative chirp and a high extinction ratio.

Therefore in accordance with a first aspect of the present invention there is provided a semiconductor Mach-Zehnder modulator having first and second Y-junction waveguide couplers, each coupler having a single waveguide optically coupled with first and second branch waveguides of the coupler, wherein the Y-junction waveguide couplers are optically coupled in Mach-Zehnder configuration to define first and second interferometric arms optically in parallel that extend from where light launched into the single waveguide of the first Y-junction waveguide coupler is divided into two components to where these two components interfere in the second Y-junction waveguide coupler, wherein the first and second interferometric arms are provided with electrode means by which an electric field is applicable to modulate their differential effective optical path length which, in the absence of any applied electric field, has a non-zero value providing, for a wavelength of light launched into the single waveguide of the first Y-junction waveguide coupler and transmitted to where said two components interfere in the second Y-junction waveguide coupler, a phase difference between said two components where they so interfere of $\pi$, or an integral odd multiple thereof.

In accordance with a second aspect of the present invention there is provided a method of modulating an optical signal of known free space wavelength, which method comprises transmitting the signal through a semiconductor Mach-Zehnder modulator having first and second Y-junction waveguide couplers, each coupler having a single waveguide optically coupled with first and second branch waveguides of the coupler, which Y-junction waveguide couplers are optically coupled in Mach-Zehnder configuration to define first and second interferometric arms optically in parallel that extend from where light launched into the single waveguide of the first Y-junction waveguide coupler is divided into two components to where these two components interfere in the second Y-junction waveguide coupler, which first and second interferometric arms are provided with electrode means by which an electric field is applicable to modulate their differential effective optical path length which, in the absence of any applied electric field, has a non-zero value providing, for light of said free space wavelength launched into the single waveguide of the first Y-junction waveguide coupler, a phase difference between said two components where they interfere of $\pi$, or an integral odd multiple thereof, and which method additionally comprises applying modulating voltages to said electrode means.

BRIEF DESCRIPTION OF THE DRAWINGS

The invention will now be described in greater detail with reference to the accompanying drawings in which:

FIG. 1A is a schematic diagram of a MQW semiconductor Mach-Zehnder modulator;

FIG. 1B is an enlarged view of a cross section of the input waveguide taken from view 1B in FIG. 1A;

FIG. 2A shows the voltage levels for single arm drive;

FIG. 2B is a frequency chirp simulation for single arm drive;

DETAILED DESCRIPTION OF THE INVENTION

Figure 3A:
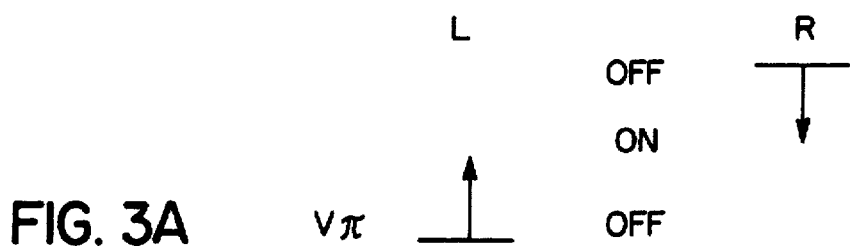
FIG. 3A shows the voltage levels for dual arm drive.

FIG. 1A illustrates schematically a semiconductor Mach-zehnder modulator with multi-quantum-wells in each branch arm. As shown the modulator 10 comprises an input Y-junction 12 having an input waveguide 14 to which light from an appropriate laser (not shown) is directed. Input waveguide 14 is approximately 2 μm wide and is single mode. It is to be understood that the input optical power from a laser may be supplied to the waveguide 14 by means of a fiber pigtail or the laser can be integrated monolithically on a common substrate. The Y-junction 12 has mixing section 16 which is approximately 4 μm wide and supports 3 modes: two symmetric modes and one anti-symmetric mode. Branch waveguides 18 and 20 are centered along two S-bend curves and are each approximately 2.0 μm wide in order to support only a single mode. Known modulators are designed such that branch waveguides 18 and 20 are equally spaced on either side of the longitudinal axis 22. Branch waveguides 18 and 20 are separated by 20 μm.

Each waveguide 18,20 has an overlying metalization layer 24,26 respectively which terminates at electrode pads 28,30 respectively. These electrodes are for independently supplying voltage to each waveguide in order to change the refractive index which, in turn, modifies the phase of the light propagating through the waveguide.

Output Y-junction 32 is similar in construction to input Y-junction 12 in that it has an output waveguide 34 to deliver the modulated signal and a pair of branch waveguides which serve to re-combine light in each arm 18,20.

The enlarged insert in FIG. 1B shows a cross-section of the input waveguide, the layer formation of which is the same for the rest of the modulator. The modulator material is characterized by a non-linear electro-optic effect. Examples of such materials are III–V alloys, InGaAsP/InP or AlGaAs/GaAs, as well as certain II–VI alloys. The layers are grown by known epitaxial techniques such as Metal Organic Chemical Vapour Deposition (MOCVD). The structure shown in FIG. 1B includes a $n^+$ InP substrate 40 on which is grown a thin InGaAs absorbing layer 42. Next a n-type InP cladding layer 44 is grown followed by the multi-quantum-well 46. MQW 46 in a preferred embodiment is in an intrinsic region comprising a plurality of quaternary (InGaAsP) layers (not shown) separated by InP barrier layers (also not shown). Although a multi-quantum-well is described in terms of a preferred embodiment, a single quantum-well may also be used. A p-type InP cladding layer 48 is grown on top of the MQW 46 and finally a $p^+$ InGaAs layer 50 which serves as a contact enhancement layer and as an absorbing layer. P-type contacts 24,26 are selectively formed on top of layer 50 and n-type contact 54 is formed on the substrate side. The bonding pads, wells and waveguide ridges or arms are simultaneously etched through the MQW layer as shown. A similar structure has been described by Rolland et al, "10 Gb/s 1.56 μm Multiquantum Well InP/InGaAsP Mach-Zehnder Optical Modulator", Electron. Lett., Vol.29, pp. 471–472, 1993.

As previously discussed negative chirp may be generated in Mach-Zehnder modulators by choosing the appropriate drive voltage or by the power splitting ratio in the two arms. The latter technique is more fully described in the aforementioned publication by Rolland et al. The modulating drive voltage can be supplied to only one arm, or to both arms in a push-pull relationship. With no voltage applied to either arm the light propagates through the modulator without phase shift and the fundamental mode is excited and propagates with only a little loss to the output. A $\pm\pi$ phase shift between the arms results in a much reduced output or "off" state. The phase shift is caused by a drive voltage swing of $V_\pi$ to one arm or a swing of $V_\pi/2$ to each arm in a push-pull relationship, i.e., $V_\pi$ to $V_\pi/2$ to one arm and $V_\pi/2$ to 0 to the other arm.

The voltage levels of a single arm drive are shown in FIG. 2A and the levels for a dual arm, push-pull configuration are shown in FIG. 3A.

From FIG. 2A it will be noted that one arm (Right) is supplied with a constant voltage $V_\pi$. The voltage to the other arm (Left) is varied from 0 to $V_\pi$. Thus, when 0 voltage is supplied to the left arm the modulator is 'off' while a $V_\pi$ voltage to the left arm causes the modulator to be 'on'. FIG. 2B reflects the frequency chirp characteristics of single arm drive conditions. The dashed line represents the drive voltage to the left arm. The solid line is the frequency chirp. Since both arms are supplied with $V_\pi$ in the 'on' mode, the absorption is high in both arms. It will be recalled that in III-V materials absorption increases with voltage. In the 'off' mode there is an imbalance in the power to the arms and this degrades the extinction ratio. The single arm drive condition, however, does lead to negative frequency chirp because the phase increases when the modulator switches the light on, but the negative chirp may be excessive.

FIG. 3A indicates the drive voltage for dual arm equal push-pull drive conditions. When the voltage at the right arm (R) changes from 0 to $V_\pi/2$, the left arm (L) simultaneously changes from $V_\pi$ to $V_\pi/2$, and the modulator switches from the "pull" state to the "push" state. The modulator has a minimum transmission at the "pull" state and a maximum transmission at the "push" state. The push-pull configuration only needs a voltage modulation amplitude of $V_\pi/2$, about 2V for a III-V Mach-Zehnder, which greatly reduces the power requirement of the electronic drive circuits.

Figure 3B:
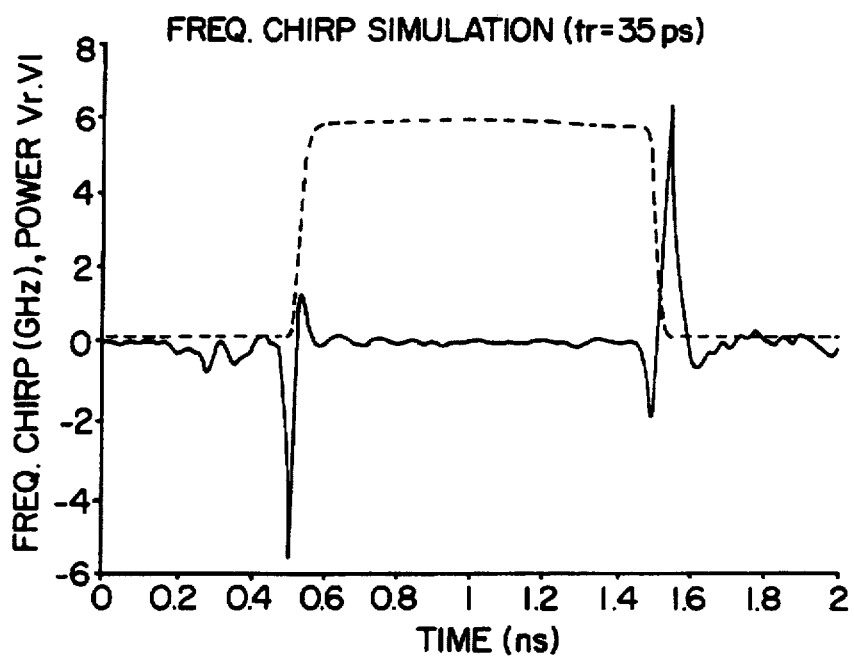
FIGS. 3B and 3C illustrate frequency chirp for the dual arm drive situation.

When the drive conditions change from the 'pull' to 'push' status, the modulator switches the light on. The phase in the deeply biased arm (L) decreases faster than the phase in the right arm increases because of the aforementioned non-linear phase properties. Therefore, the equal push-pull drive conditions are likely to generate positive chirp. This is shown in FIG. 3B wherein the blue shift is dominant in the rising edge.

Figure 3C:
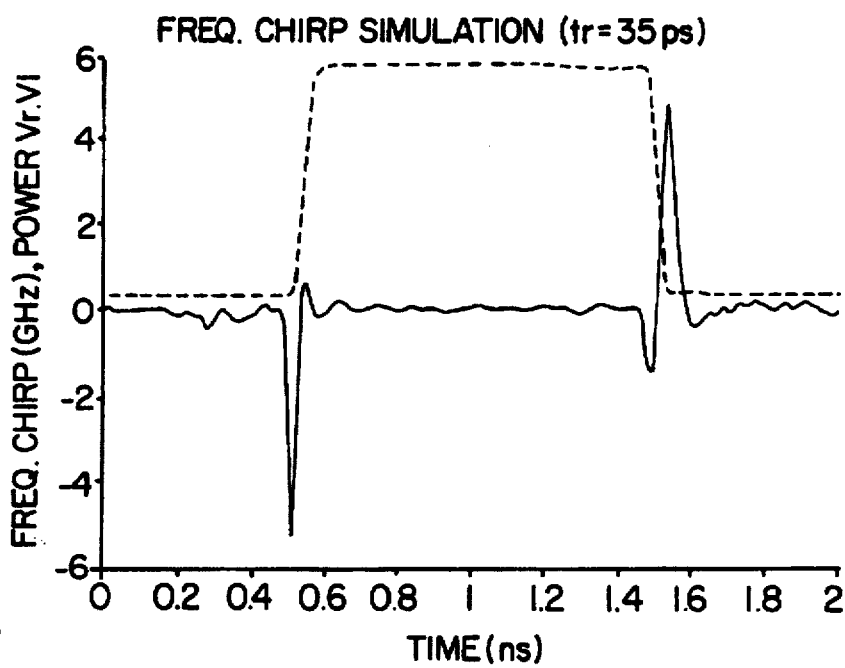

A negative frequency chirp can be achieved when using a push-pull configuration by putting less power into the deeply biased arm. With unequal power splitting, the positive chirp associated with the deeply biased arm is suppressed so that the negative chirp associated with the other arm will dominate in the initial stage of the rising edge. To achieve the unequal power splitting, an asymmetric Y-junction design is used. Due to both the extra absorption and having less power in the deeply biased arm, the extinction ratio of the modulator is low. This is shown in FIG. 3C, wherein the power ratio is 0.4 to 0.6. Consequently, there is a trade-off between extinction ratio and negative frequency chirp.

Figure 6A:
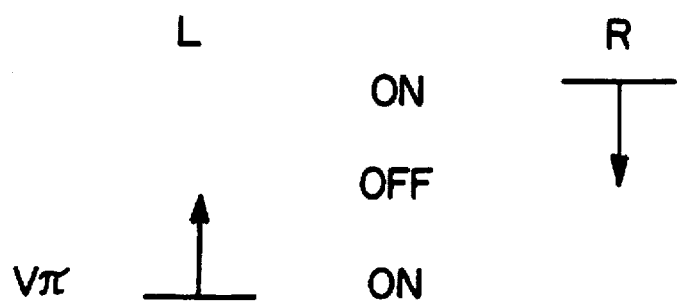
FIG. 6A shows the voltage levels for dual arm operation of the device of FIG. 4.

The present invention provides for controllable negative chirp while maintaining good extinction ratio. This is achieved through constructing the modulator so that the effective optical path length of one of its arms is longer than the other by an amount providing, for light of known wavelength $\lambda$, a differential phase shift of $\pi$ (or an odd multiple of $\pi$, i.e., $n\pi$ where n=1,3,5...). As a consequence of this shift the modulator is in an 'off' state with no differential voltage between the arms and is 'on' when there is a differential voltage. In the "off" state, because there is no differential voltage, the extinction ratio is theoretically infinite assuming equal power splitting in both arms. The Mach-Zehnder modulator is turned "on" when the drive conditions change from the "push" to the "pull" status. The phase in the deeply biased arm (Left) increases faster than the phase in the right arm decreases which, this time, results in desirable negative chirp. Thus the non-linear phase change is advantageous. This relationship is shown in FIG. 6A. The amount of negative chirp can be controlled by directing slightly more optical power to the deeply biased arm. Although this degrades the extinction ratio slightly, the effect is not significant as the ratio is, in theory, infinite for equal power in the arms.

A differential phase shift between the two arms of the modulator may be provided by making one arm physically longer than the other by an amount $\Delta L$. If both arms have the same modal effective refractive index $n_{eff}$ for light of a free space wavelength $\lambda$ propagating in fundamental mode in these arms, then a differential phase shift of $\pi$ is provided by satisfying the equation $$\Delta L = \frac{\lambda}{2n_{eff}}$$

For a modulator operating at a (free space) wavelength $\lambda=1.56$ μm, and assuming a value of 3.23 for $n_{eff}$, $\Delta L=0.241$ μm. This small amount may conveniently be provided by accommodating half the difference in the input Y-junction and the other half in the output Y-junction. For this purpose the S-bend of one branch waveguide of each Y-junction is made physically longer than its counterpart by adjusting the relative offset of the two arms with respect to the centre line passing through the centres of the input and output waveguides as discussed below.

Figure 4:
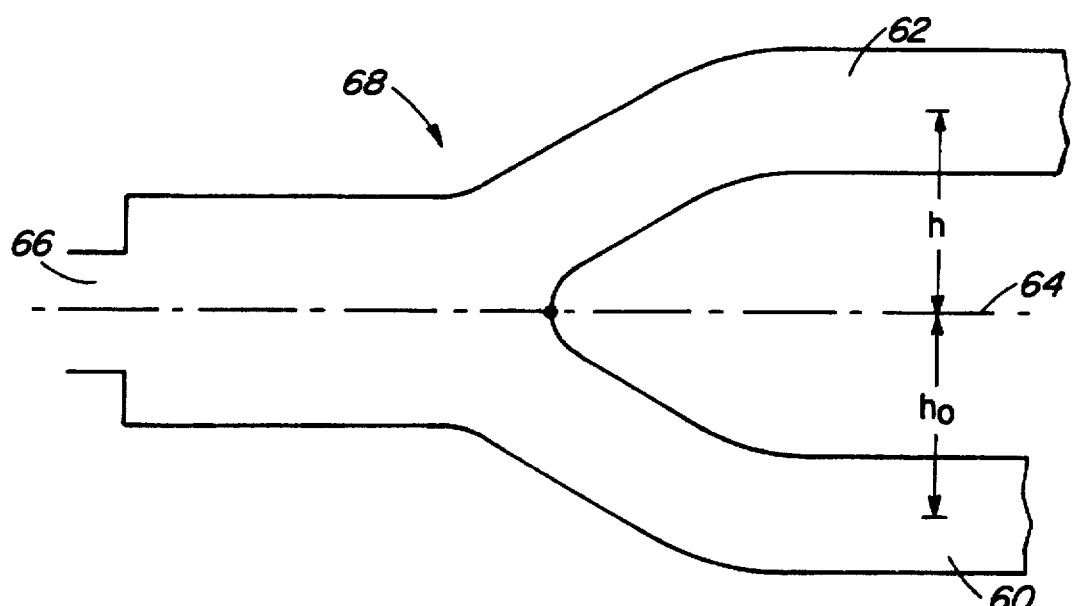
FIG. 4 is a partial view of a $\pi$ shifted modulator of the present invention

FIG. 4 is a schematic representation of a portion of a Mach-Zehnder modulator having a $\pi$ shift. This shift is best seen in terms of the difference in spacing of the branch waveguides 60,62 from the longitudinal axis 64 of the modulator. As shown the longitudinal axis 64 is taken along the central line of the input waveguide 66 of the input Y-junction 68. The distance between the centre of branch waveguide 60 and the longitudinal axis 64 is given as $h_0$ while the distance between the centre of branch waveguide 62 and the longitudinal axis 64 is given as h. In this example h is greater than $h_0$ although it is to be understood that $h_0$ could be greater than h and still give the desired result.

Figure 5:
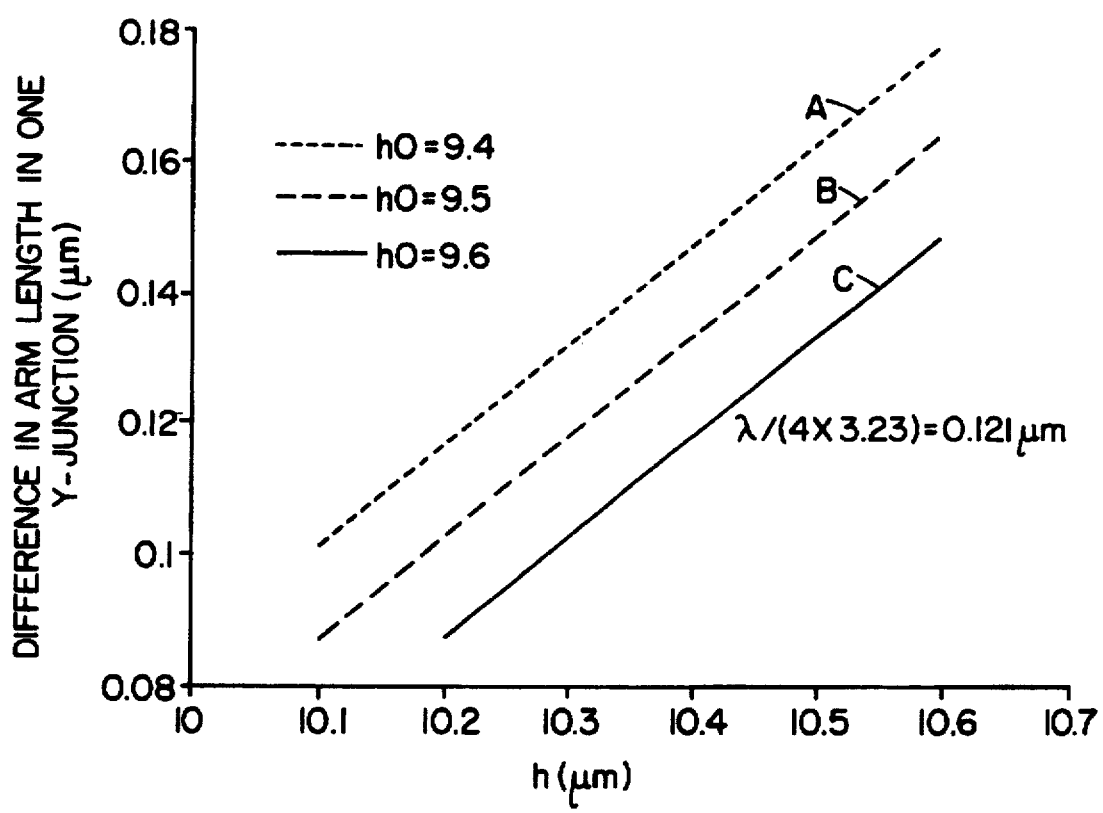
FIG. 5 shows the relationship between arm offset and difference in path length.

The manner in which the difference between h and $h_0$ impacts the difference in total length between the optical paths as between arms 60 and 62 is shown graphically in FIG. 5. In this Figure the horizontal line represents the distance h in μm. The three lines A, B and C represent three different values of $h_0$, namely, 9.4 μm, 9.5 μm, and 9.6 μm respectively. The vertical axis gives the difference of the length between the two optical paths in one Y-junction. Thus, for the length differential set out previously, i.e., 0.12 μm, three options are depicted in the graph of FIG. 5. For $h_0=9.4$ μm, h should be 10.22 μm; for $h_0=9.5$ μm, h=10.31;

and for $h_0=9.6$ μm, $h=10.41$. From this it will be observed that the total difference between h and $h_0$ is approximately 0.8 μm which represents a dimension well within the capabilities of current fabrication techniques.

The device depicted in FIG. 4, in a preferred embodiment, has a length of 600 μm over the linear region with the S-bend length for both input and output Y-junctions being 100 μm. The width of each waveguide is 2.0 μm.

Figure 6B:
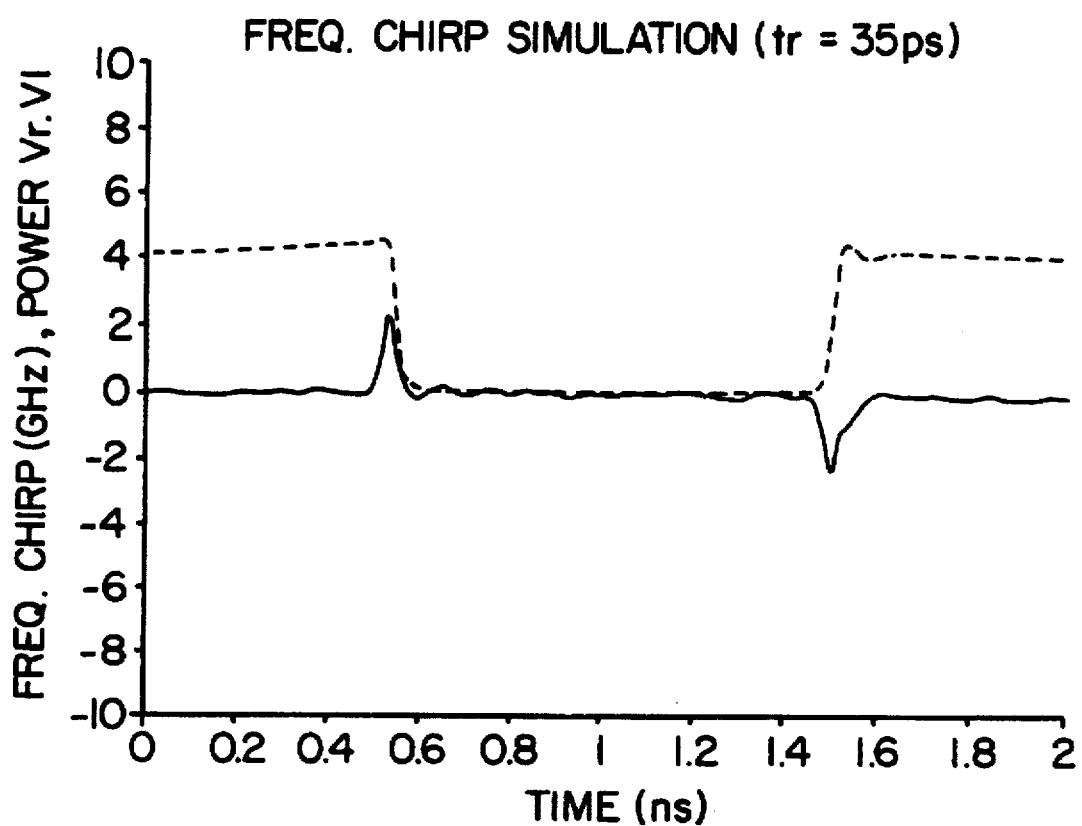
FIG. 6B illustrates frequency chirp for the modulator operated in accordance with conditions shown in FIG. 6A.

As discussed previously the π shift alters the drive conditions required to generate intensity modulation. Considering the situation where both arms are supplied with drive voltage (assuming a push-pull configuration) in the π shift arrangement an 'off' condition exists when equal voltage is supplied to the arms. An 'on' condition is instead achieved when there is a $V_\pi$ difference in voltage between arms. This relative step is shown in FIG. 6A. FIG. 6B shows the frequency chirp for the π shifted device when driven by the voltage levels of FIG. 6A. This assumes an equal optical power to each arm. FIG. 6B shows an extinction ratio of 21.5 dB which is much superior to that achieved by non-π shifted modulators. The extinction ratio is theoretically infinity. FIG. 6B also reveals a negative chirp condition.

Figure 7:
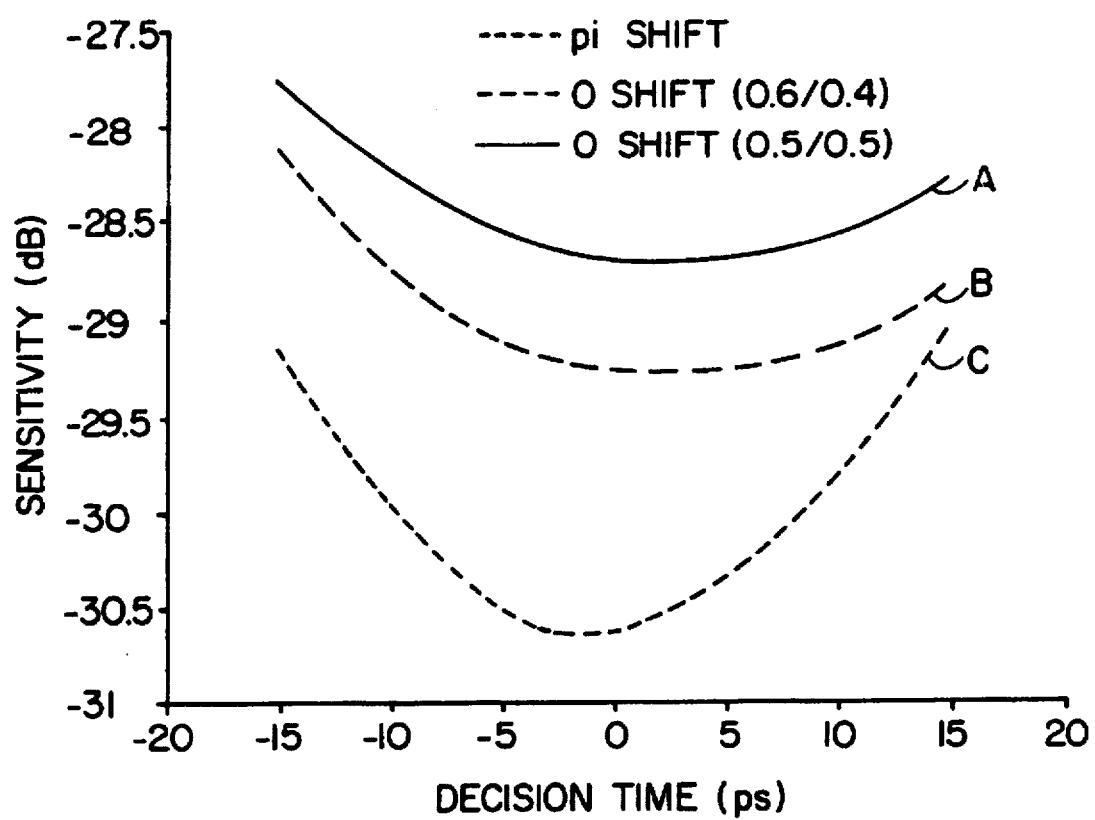
FIG. 7 is a plot of sensitivity vs. decision time for different device configurations.

FIG. 7 compares the sensitivity vs. decision time for Mach-zehnder modulators according to the prior art and the π shifted version of the present invention. In FIG. 7, curve A represents a prior art modulator with equal optical power to each arm. Curve B represents a prior art modulator with unequal (0.6/0.4) optical power to each arm. Curve C represents a π shifted modulator according to the present invention. The improvement in sensitivity is considerable and represents a significant advance in the technology. Although the previous discussion refers to a length differential between optical paths of π, it is to be understood that length differentials which are odd multiples of π will also give the same result.

While a particular embodiment of the invention has been described and illustrated, it will be apparent to one skilled in the art that variations in the basic concept are possible. For example, it is contemplated that the π shift (including odd multiples thereof) can be incorporated in the modulator by adjusting the shape of one of the S-bends in the input Y-junction. It is to be understood, however, that such variations are included within the scope of this invention as defined by the appended claims.

We claim:

1. A semiconductor Mach-Zehnder modulator having first and second Y-junction waveguide couplers, each coupler having a single waveguide optically coupled with first and second branch waveguides of the coupler, wherein the Y-junction waveguide couplers are optically coupled in Mach-Zehnder configuration to define first and second interferometric arms optically in parallel that extend from where light launched into the single waveguide of the first Y-junction waveguide coupler is divided into two components to where these two components interfere in the second Y-junction waveguide coupler, wherein the first and second interferometric arms are provided with electrode means by which an electric field is applicable to modulate their differential effective optical path length which, in the absence of any applied electric field, has a non-zero value providing, for a wavelength of light launched into the single waveguide of the first Y-junction waveguide coupler and transmitted to where said two components interfere in the second Y-junction waveguide coupler, a phase difference between said two components where they so interfere of π, or an integral odd multiple thereof.

2. A phase modulator as defined in claim 1, said waveguides being provided with multi-quantum-wells.

3. A phase modulator as defined in claim 2, said first Y-junction waveguide coupler being asymmetrical with respect to the sharing, between its first and second branches, of optical power launched into its single waveguide.

4. A phase modulator as defined in claim 2, said first branch waveguides of said first and second Y-junction waveguide couplers having distal ends lying along a first common axis, said second branch waveguides of said first and second Y-junction waveguide couplers having distal ends lying along a second common axis, and said single waveguides of said first and second Y-junction waveguide couplers having distal ends lying along a third common axis, wherein the first, second and third common axes are parallel axes and the distance between the first and third axes is smaller than the distance between the second and third axes.

5. A phase modulator as defined in claim 1, said first Y-junction waveguide coupler being asymmetrical with respect to the sharing, between its first and second branches, of optical power launched into its single waveguide.

6. A phase modulator as defined in claim 5, said first branch waveguides of said first and second Y-junction waveguide couplers having distal ends lying along a first common axis, said second branch waveguides of said first and second Y-junction waveguide couplers having distal ends lying along a second common axis, and said single waveguides of said first and second Y-junction waveguide couplers having distal ends lying along a third common axis, wherein the first, second and third common axes are parallel axes and the distance between the first and third axes is smaller than the distance between the second and third axes.

7. A phase modulator as defined in claim 1, said first branch waveguides of said first and second Y-junction waveguide couplers having distal ends lying along a first common axis, said second branch waveguides of said first and second Y-junction waveguide couplers having distal ends lying along a second common axis, and said single waveguides of said first and second Y-junction waveguide couplers having distal ends lying along a third common-axis, wherein the first, second and third common axes are parallel axes and the distance between the first and third axes is smaller than the distance between the second and third axes.

8. The semiconductor Mach-Zehnder modulator according to claim 1, wherein the first interferometric arm is physically longer than the second interferometric arm by a length differential which provides the phase difference.

9. A method of modulating an optical signal of known free space wavelength, which method comprises transmitting the signal through a semiconductor Mach-Zehnder modulator having first and second Y-junction waveguide couplers, each coupler having a single waveguide optically coupled with first and second branch waveguides of the coupler, which Y-junction waveguide couplers are optically coupled in Mach-Zehnder configuration to define first and second interferometric arms optically in parallel that extend from where light launched into the single waveguide of the first Y-junction waveguide coupler is divided into two components to where these two components interfere in the second Y-junction waVeguide coupler, which first and second interferometric arms are provided with electrode means by which an electric field is applicable to modulate their differential effective optical path length which, in the absence of any applied electric field, has a non-zero value providing, for light of said free space wavelength launched into the single waveguide of the first Y-junction waveguide coupler, a phase difference between said two components where they interfere of π, or an integral odd multiple thereof, and which method additionally comprises applying modulating voltages to said electrode means.

10. A method as defined in claim 9, wherein equal push-pull modulating voltage is supplied to each one of said first and second interferometric arms.

11. A method as defined in claim 9, wherein a optical signal applied to the modulator by way of the single waveguide of the first Y-junction waveguide coupler is launched in unequal power proportions into its first and second branch waveguides.

12. The method according to claim 9, wherein the first interferometric arm is physically longer than the second interferometric arm by a length differential which provides the phase difference.

* * * * *